(12) United States Patent
Jeong et al.

(10) Patent No.: US 10,945,159 B2
(45) Date of Patent: Mar. 9, 2021

(54) BASE STATION APPARATUS, TERMINAL APPARATUS, AND QOS CONTROL METHOD

(71) Applicant: SK TELECOM CO., LTD., Seoul (KR)

(72) Inventors: Sang Soo Jeong, Seoul (KR); Jong Han Park, Seoul (KR)

(73) Assignee: SK TELECOM CO., LTD., Seoul (KR)

(*) Notice: Subject to any disclaimer, the term of this patent is extended or adjusted under 35 U.S.C. 154(b) by 166 days.

(21) Appl. No.: 16/303,748

(22) PCT Filed: Mar. 6, 2017

(86) PCT No.: PCT/KR2017/002367
§ 371 (c)(1),
(2) Date: Nov. 21, 2018

(87) PCT Pub. No.: WO2018/052172
PCT Pub. Date: Mar. 22, 2018

(65) Prior Publication Data
US 2020/0322845 A1     Oct. 8, 2020

(30) Foreign Application Priority Data

Sep. 19, 2016    (KR) .................. 10-2016-0119450

(51) Int. Cl.
*H04W 28/12*    (2009.01)
*H04W 28/02*    (2009.01)
*H04W 28/18*    (2009.01)

(52) U.S. Cl.
CPC ....... *H04W 28/12* (2013.01); *H04W 28/0263* (2013.01); *H04W 28/0268* (2013.01); *H04W 28/18* (2013.01)

(58) Field of Classification Search
CPC ............ H04W 28/12; H04W 28/0263; H04W 28/0268; H04W 28/18; H04W 28/0205;
(Continued)

(56) References Cited

U.S. PATENT DOCUMENTS

| | | | | |
|---|---|---|---|---|
| 6,690,679 B1* | 2/2004 | Turunen | ............... | H04W 28/18 370/230.1 |
| 7,609,673 B2* | 10/2009 | Bergenlid | ............... | H04L 29/06 370/329 |
| 7,907,524 B2* | 3/2011 | Willars | ................. | H04W 28/18 370/230 |
| 8,150,411 B2* | 4/2012 | Fischer | ................. | H04W 28/18 455/452.2 |

(Continued)

FOREIGN PATENT DOCUMENTS

| | | |
|---|---|---|
| JP | 2012517144 A | 7/2012 |
| JP | 2013535157 A | 9/2013 |

(Continued)

OTHER PUBLICATIONS

Roberts, J. W., and S. Oueslati-Boulahia. "Quality of service by flow-aware networking." Philosophical Transactions of the Royal Society of London. Series A: Mathematical, Physical and Engineering Sciences 358.1773 (2000): 2197-2207. (Year: 2000).*

(Continued)

*Primary Examiner* — Sharad Rampuria
(74) *Attorney, Agent, or Firm* — Hauptman Ham, LLP

(57) ABSTRACT

Disclosed are a BS apparatus, a terminal apparatus, and a QoS control method for implementing the service flow-based QoS control without increasing complexity compared to the conventional bearer-based QoS control method.

12 Claims, 8 Drawing Sheets

(58) Field of Classification Search
CPC ...... H04W 28/24; H04W 88/08; H04L 47/80;
H04L 47/78; H04L 47/74; H04L 47/72;
H04L 47/70; H04L 47/38; H04L 47/32;
H04L 47/24; H04L 47/20; H04L 47/12;
H04L 47/10

See application file for complete search history.

(56) References Cited

U.S. PATENT DOCUMENTS

| | | | |
|---|---|---|---|
| 2008/0123660 A1* | 5/2008 | Sammour | H04W 72/1236 370/395.21 |
| 2011/0058523 A1 | 3/2011 | Manning et al. | |
| 2014/0328288 A1 | 11/2014 | Lu et al. | |

FOREIGN PATENT DOCUMENTS

| | | |
|---|---|---|
| KR | 10-2006-0122980 A | 11/2006 |
| KR | 10-2013-0032899 A | 4/2013 |
| KR | 10-2014-0036901 A | 3/2014 |

OTHER PUBLICATIONS

Japanese Office Action dated Sep. 17, 2019, in connection with the Japanese Patent Application No. 2018-561530 citing the above reference(s).

European Search Report dated Oct. 16, 2020, in connection with corresponding Eurpean Patent Application No. 17851050.9, citing the above references.

T-Mobile et al. "QoS operator requirements and use cases", 3GPP Draft; S2-062629, 3rd Generation Partnership Project(3GPP), Mobile Competence Centre. p. 2; Figures 1, 2. Aug. 10, 2006.

T-Mobile et al. "Support of QoS Differentiation between packet flows sharing the same bearer", 3GPP Draft; S2-062630, 3rd Generation Partnership Project(3GPP), Mobile Competence Centre. p. 2; Figures 7.12-2. Aug. 10, 2006.

Thomas Deis et al: "Mobile Backhaul chapter 8 : QoS" Mobile Backhaul, First edition. pp. 250-302. May 7, 2012.

Mehdi Alasti et al., Qualit of Service in WiMAX and LTE Networks, Topics in Wireless Communications, May 2010, pp. 104-111.

Korean Office Action dated Nov. 13, 2019, in connection with the Korean Patent Application No. 10-2018-0130169 citing the above reference(s).

Korean Office Action dated Nov. 13, 2019, in connection with the Korean Patent Application No. 10-2016-0119450 citing the above reference(s).

International Search Report for PCT/KR2017/002367 dated Jun. 16, 2017, citing the above reference(s).

* cited by examiner

BASE STATION APPARATUS, TERMINAL APPARATUS, AND QOS CONTROL METHOD

BACKGROUND OF THE INVENTION

1. Field of the Invention

The present disclosure relates to QoS control technology for transmitting packets of a communication service at different QoS levels, More particularly, the present disclosure relates to technology of enabling the service flow-based. QoS control without an increase in complexity compared to a conventional bearer-based QoS control method.

2. Description of the Prior Art

In a mobile communication system, a Quality of Service (QoS) varies depending on a media type of a communication service used by a terminal (user), and a QoS control is provided for transmitting a packet of the communication service with a guaranteed QoS level suitable for the media type.

In connection with this, a QoS control method provided by an LTE network is an EPS bearer (hereinafter, referred to as a bearer) based QoS control method.

In the LTE network, an EPS bearer, that is, a bearer is generated for transmitting data to allow a terminal (user) to use a communication service.

The bearer may be a tunnel (a wireless section+a wired section) generated between a terminal and a P-GW via the wireless section for connecting the terminal and a Base Station (BS) and the wired section for connecting the BS and an S-GW or the P-GW.

Data of the user (terminal) is transmitted in the form of an IP-based packet through the tunnel, that is, the bearer, and a traffic flow according to packet transmission is referred to as a service flow.

In the prior art, types of communication services provided to terminals (users) relatively limited, and thus a bearer-based. QoS control method of mapping a group of several types of communication services to one bearer and applying QoS based on the one bearer is used.

Accordingly, the conventional QoS control method defines a QoS level (QoS parameter) for each bearer and guarantees (applies) QoS based on bearers, so that the same QoS (QoS level of the bearer) is applied to all of service flows transmitted through one bearer.

As a result, the conventional bearer-based QoS control method has an advantage in that complexity of the QoS control can be reduced but has a limit in that differential QoS cannot be applied to service flows belonging to one bearer.

Such a limit would not be a big problem in the existing state in which types of communication services are limited. However, it can be a problem which should be necessarily solved since various types of communication services will be rapidly developed/introduced currently or in the future (for example, 5G).

Accordingly, the present disclosure implements the service flow-based QoS control capable of applying more differential QoS without increasing complexity compared to the conventional bearer-based QoS control method.

SUMMARY OF THE INVENTION

An aspect of the present disclosure is to implement the service flow-based QoS control by which more differential QoS can be applied without increasing complexity compared to the conventional bearer-based QoS control method.

In accordance with an aspect of the present disclosure, a Base Station (BS) apparatus is provided. The BS apparatus includes: a determination unit configured to determine service flow for downlink packets to be transmitted to a terminal; an identification unit configured to identify a particular Quality of Service (QoS) parameter defined for the service flow from QoS parameters defined for each of service flows; and a transmitter configured to apply the particular QoS parameter to the downlink packet and transmit the downlink packet to the terminal with particular QoS for the service flow.

Specifically, the BS apparatus may further include a control information transfer unit configured to insert QoS control information for identifying the particular QoS parameter into a header of a particular downlink packet of the service flow, thereby allowing the terminal to transmit an uplink packet of the service flow with the particular QoS based on the QoS control information.

Specifically, the particular downlink packet may include at least one of a downlink packet related to initiation of the service flow and a downlink packet related to change of the QoS parameter of the service flow while the service flow is maintained.

Specifically, the BS apparatus may further include an interworking controller configured to, when the terminal is handed over to another network supporting a QoS control policy different from that of the BS apparatus, provide QoS conversion information for converting the particular QoS parameter into a QoS parameter according to the different QoS control policy to the terminal.

Specifically, the different QoS control policy may be a bearer-based QoS control policy for guaranteeing different QoS levels for each of bearers.

Specifically, the priority of the matching rule for each service flow may be determined based on the QoS level of each service flow.

Specifically, the interworking controller may provide the QoS conversion information only when continuity of the service flow is required.

In accordance with another aspect of the present disclosure, a terminal apparatus is provided. The terminal apparatus includes: an acquisition unit configured to acquire QoS control information from a header of a particular downlink packet of downlink packets received from a Base Station (BS); a QoS controller configured to map a particular QoS parameter identified from the QoS control information to a service flow of the particular downlink packet; and a transmitter configured to apply the particular QoS parameter to an uplink packet of the service flow and transmit the uplink packet with particular QoS defined in the service flow.

Specifically, when a handover is performed to another network supporting a QoS control policy different from that of the BS, the QoS controller may convert the particular QoS parameter into a QoS parameter according to the different QoS control policy based on QoS conversion information provided from the BS.

Specifically, the QoS conversion information may include a matching rule for each service flow by which a service flow matches a bearer, a priority of the matching rule for each service flow, and a QoS parameter predefined for each bearer.

Specifically, the QoS controller may be configured to search for a matching rule that matches the service flow from the matching rule for each service flow based on the QoS conversion information in an order from a matching rule having the highest priority to a matching rule having the lowest priority, match the service flow to a bearer of the found matching rule, and convert the particular QoS parameter into a QoS parameter defined in the matched bearer.

In accordance with another aspect of the present disclosure, a method of controlling QoS is provided. The method includes: determining service flow for downlink packet to be transmitted to a terminal by a Base Station (BS) apparatus; identifying a particular Quality of Service (QoS) parameter defined for the service flow from QoS parameters defined for each of service flows by the BS apparatus; and applying the particular QoS parameter to the downlink packet and transmit the downlink packet to the terminal with particular QoS for service flow by the BS apparatus.

Specifically, the method may further include inserting QoS control information for identifying the particular QoS parameter into a header of a particular downlink packet of the service flow, thereby allowing the terminal to transmit an uplink packet of the service flow with the particular QoS based on the QoS control information by the BS apparatus.

Specifically, the BS apparatus may further include providing, when the BS apparatus identifies that the terminal is handed over to another network supporting a QoS control policy different from that of the BS apparatus, QoS conversion information for converting the particular QoS parameter into a QoS parameter according to the different QoS control policy to the terminal.

In accordance with another aspect of the present disclosure, a method of controlling QoS is provided. The method includes: acquiring QoS control information from a header of a particular downlink packet of downlink packets received from a Base Station (BS) by a terminal apparatus; mapping a particular QoS parameter identified based on the QoS control information to a service flow of the particular downlink packet by the terminal apparatus; and applying the particular QoS parameter to an uplink packet of the service flow and transmit the uplink packet with particular QoS defined in the service flow by the terminal apparatus.

According to a BS apparatus, a terminal apparatus, and a QoS control method of the present disclosure, it is possible to apply differential QoS, that is, service qualities to respective communication services by enabling the service flow-based QoS control without increasing complexity compared to the conventional bearer-based QoS control method.

DETAILED DESCRIPTION OF THE EXEMPLARY EMBODIMENTS

Hereinafter, the present disclosure will be described with reference to the accompanying drawings.

Prior to the detailed description of the present disclosure, functions (effects) achieved by a service flow-based QoS control method proposed by the present disclosure will be first described below.

The present disclosure achieves the effects in that information (QoS control information) required for the service flow-based QoS control can be provided to the terminal without separate signaling, the QoS control information is transmitted in the form of piggyback and thus packet inspection efficiency increases, disconnection of a communication service of the terminal is minimized during a handover by enabling interworking QoS control methods between systems before and after the handover, and the interworking of the QoS control methods between systems before and after the handover is selectively reflected according to sensitivity of the communication service.

Hereinafter, an apparatus and/or a configuration for implementing a service flow-based QoS control method proposed by the present disclosure will be described and the effects described above will be described in more detail.

Meanwhile, the conventional bearer-based QoS control method is described with reference to FIG. 1.

The conventional bearer-based QoS control method is a method of mapping a group of several types of communication services to an EPS bearer, that is, a bearer and applying QoS based on the bearer.

Figure 1:
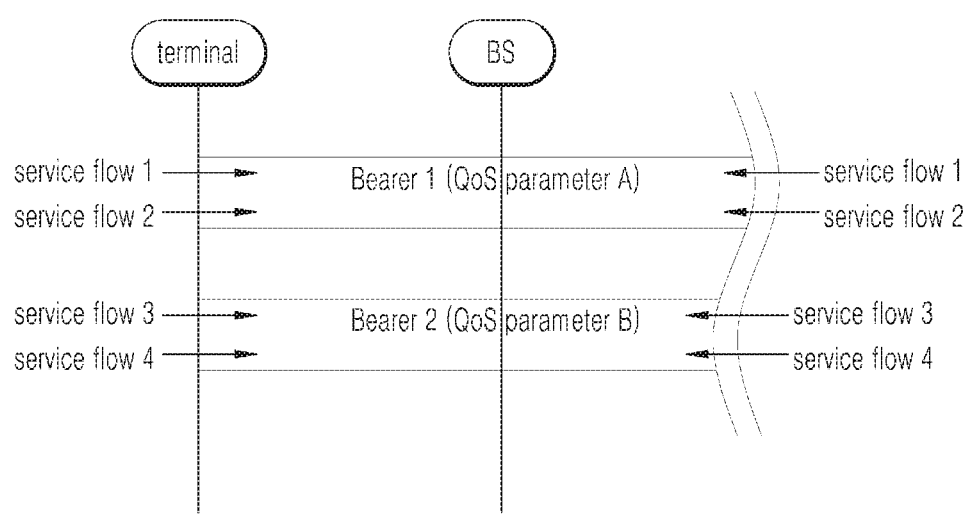
FIG. 1 illustrates a conventional bearer-based QoS control method.

As illustrated in FIG. 1, in order to use the bearer-based QoS control method, bearers, for example, bearers 1 and 2 are generated in a terminal (user) for guaranteeing QoS required for a communication service, which is to be used by the terminal.

Each of bearers 1 and 2 may be default bearers and dedicated bearers.

As illustrated in FIG. 1, it is assumed that service flow 1 of communication service 1 and service flow 2 of communication service 2 used by the terminal belong to one bearer (bearer 1) and service flow 3 of communication service 3 and service flow 4 of communication service 4 used by the terminal belong to one bearer 2.

In this case, the same QoS, that is, a QoS level (QoS parameter A) of bearer 1 is applied to both service flows 1 and 2 transmitted through bearer 1, and the same QoS, that is, a QoS level (QoS parameter B) of bearer 2 is applied to both service flows 3 and 4 transmitted through bearer 2.

As a result, the conventional bearer-based QoS control method has an advantage in that complexity in the QoS control can be reduced since QoS is applied based on bearers as a logical unit, but has a limit in that differential QoS cannot be applied to service flows belonging to one bearer.

Figure 2:
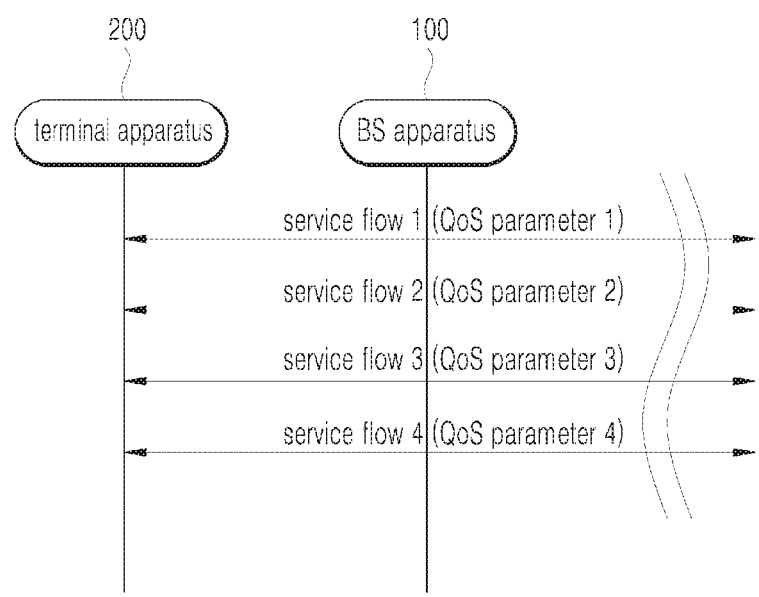
FIG. 2 illustrates a service flow-based QoS control method according to an embodiment of the present disclosure.

Accordingly, the present disclosure applies differential QoS, that is, service qualities to communication services, by implementing the service flow-based QoS control as illustrated in FIG. 2.

However, when the service flow-based QoS control is implemented, complexity in the QoS control increases compared to the conventional bearer-based QoS control method.

The present disclosure proposes a service flow-based QoS control method by which differential QoS can be applied to respective communication services without increasing complexity compared to the conventional bearer-based QoS control method.

Figure 3:
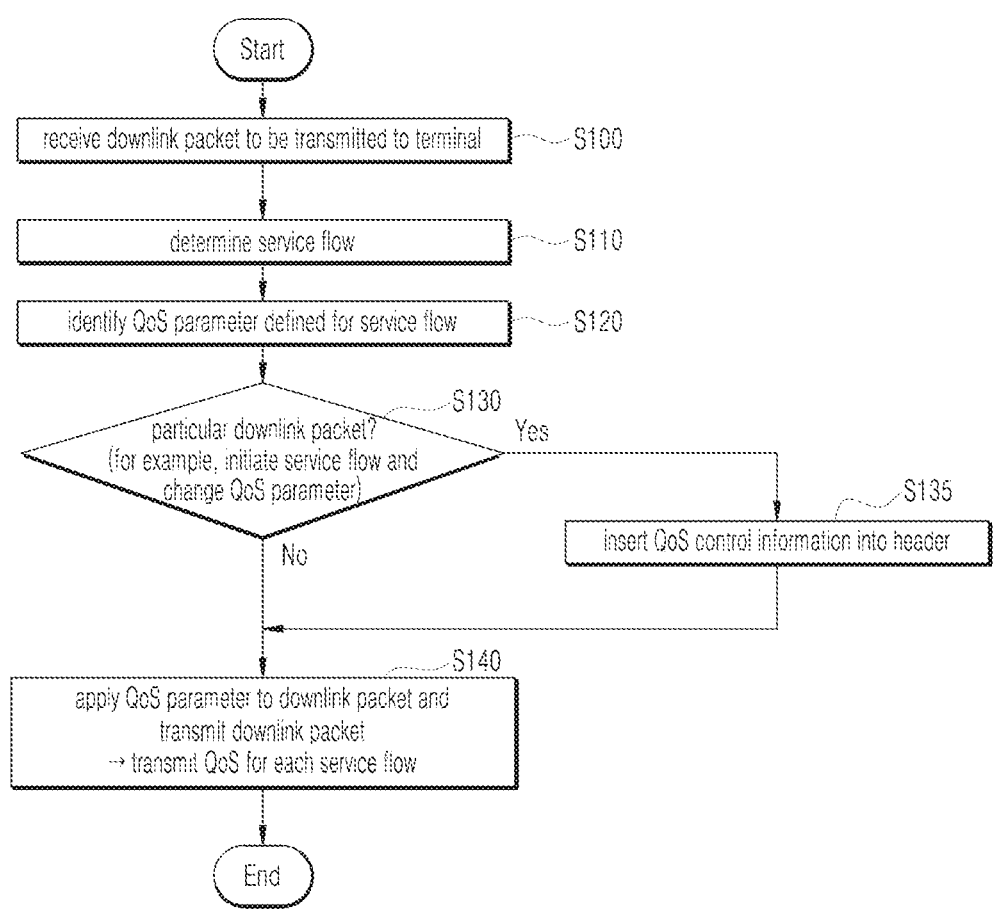
FIG. 3 is a control flowchart illustrating a QoS control method (service flow-based QoS control) in a viewpoint of a BS according to an embodiment of the present disclosure.

The QoS control method according to the present disclosure (the service flow-based QoS control) will be described from the viewpoint of a BS with reference to FIG. 3.

Accordingly, for convenience of description, the QoS control method according to the present disclosure is described hereinafter by describing a method of operating the BS apparatus 100.

In the QoS control method according to the present disclosure, that is, the method of operating the BS apparatus 100, service flows are determined for downlink packets to be transmitted to the terminal 200.

That is, in the method of operating the BS apparatus 100, when a downlink packet to be transmitted to the terminal 200 is received from a network (not shown) in S100, the BS apparatus 100 determines service flow on the basis of 5-tuple identified in a header of the downlink packet, that is, a Source IP, a Destination IP, a Source Port, a Destination Port, and a Protocol ID in S110.

Hereinafter, for convenience of description, it is assumed that a service flow of the downlink packet is determined to be service flow 1.

In the method of operating the BS apparatus 100, the BS apparatus 100 identifies a particular QoS parameter defined for service flow 1 of the downlink packet among Quality of Service (QoS) parameters defined for respective service flows.

Hereinafter, for convenience of description, a particular QoS parameter defined for service flow 1 is referred to as QoS parameter 1.

At this time, in the method of operating the BS apparatus 100, the BS apparatus 100 identifies whether the downlink packet is a particular downlink packet in which QoS control information should be included in S130.

For example, in the method of operating the BS apparatus 100, when the downlink packet is a downlink packet of a time point at which the terminal 200 starts using communication service 1 and thus service flow 1 for the terminal 200 is initiated or a downlink packet of a time point at which QoS parameter 1 of service flow 1 is changed while service flow 1 for the terminal 200 is maintained, the BS apparatus 100 identifies that the downlink packet is a particular downlink packet Which should include QoS control information.

In the method of operating the BS apparatus 100, when it is identified that the downlink packet is not the particular downlink packet in S130, the BS apparatus 100 applies QoS parameter 1 to the downlink packet and transmits the downlink packet to the terminal 200 with particular QoS defined for service flow 1.

Meanwhile, in the method of operating the BS apparatus 100, when it is identified that the downlink packet is the particular downlink packet in S130, the BS apparatus 100 inserts QoS control information into the header, more specifically, an L2 header of the downlink packet in S135, and applies QoS parameter 1 to the downlink packet and transmits the downlink packet to the terminal 200 with particular QoS defined for service flow 1.

That is, in the method of operating the BS apparatus 100, the BS apparatus applies a QoS parameter (QoS level) defined for a service flow of the downlink packet to the downlink packet and transmits the downlink packet at the guaranteed QoS level based on service flow.

As illustrated in FIG. 2, it is assumed that service flows 1, 2, 3, and 4 for the terminal 200 are generated as the terminal 200 uses communication services 1, 2, 3, and 4.

In this case, the BS apparatus 100 according to the present disclosure may apply QoS parameter 1 (QoS level 1) defined for service flow 1 of the packet of communication service 1 to the corresponding packet and transmit the corresponding packet, apply QoS parameter 2 (QoS level 2) defined for service flow 2 of the packet of communication service 2 to the corresponding packet and transmit the corresponding packet, apply QoS parameter 3 (QoS level 3) defined for service flow 3 of the packet of communication service 3 to the corresponding packet and transmit the corresponding packet, and apply QoS parameter 4 (QoS level 4) defined for service flow 4 of the packet of communication service 4 to the corresponding packet and transmit the corresponding packet, thereby transmitting the packets with the guaranteed QoS levels based on service flows.

At this time, the BS apparatus 100 according to the present disclosure may perform the service flow-based QoS control for downlink traffic and inform the terminal of information (QoS control information) required for the service flow-based QoS control without using a separate control message (separate signaling).

Hereinafter, the QoS control method (service flow-based QoS control) according to the present disclosure will be described from the viewpoint of the terminal with reference to FIG. 4.

For convenience of description, the QoS control method according to the present disclosure will be described by describing a method of operating the terminal apparatus 200.

In the QoS control method according to the present disclosure, that is, the method of operating the terminal apparatus 200, when a downlink packet is received from the BS 100 in S200, a field in which identification information is recorded is identified in a header, more specifically, an L2 header of the downlink packet. And it is identified whether the downlink packet is a particular downlink packet including a QoS parameter based on the identification information when there is the identification information in S210.

In the method of operating the terminal apparatus 200, when it is identified that the downlink packet received this time is the particular downlink packet including the QoS parameter (Yes of S210), the terminal apparatus 200 may acquire QoS control information from the header (L2 header) of the downlink packet in S220.

In the method of operating the terminal apparatus 200, the terminal apparatus 200 maps the particular QoS parameter identified from the previously acquired QoS control information to a service flow of the particular downlink packet received this time in S230.

More specifically, in the method of operating the terminal apparatus 200, the terminal apparatus 200 may identify the service flow of the particular downlink packet on the basis of 5-tuple, that is, a source IP, a destination IP, a source port, a destination port, and a protocol ID identified in a header of the particular downlink packet received this time.

As described above, it is assumed that the BS 100 identifies service flow 1 and the QoS control information for identifying QoS parameter 1 defined for service flow 1 is inserted into the header of the particular downlink packet and then transmitted.

In this case, in the method of operating the terminal apparatus 200, the terminal apparatus 200 may identify service flow 1 on the basis of 5-tuple identified in the header of the particular downlink packet.

In the method of operating the terminal apparatus 200, the terminal apparatus 200 maps QoS parameter 1 identified from the previously acquired QoS control information to service flow 1 of the particular downlink packet.

At this time, in the method of operating the terminal apparatus 200, the terminal apparatus 200 may store service flow and QoS parameter mapping information generated by mapping QoS parameter 1 to service flow 1, when the terminal apparatus 200 maps QoS parameter 1 to 5-tuple (the source IP, the destination IP, the source port, the destination port, and the protocol ID) which is the criterion for identifying service flow 1.

Further, in the method of operation the terminal apparatus 200, the terminal apparatus 200 may process the downlink packet received this time in S240.

Of course, in the method of operating the terminal apparatus 200, when it is identified that the downlink packet received this time is not the particular packet in S210, the terminal apparatus 200 may process the downlink packet received this time in S240 without steps S220 and 230.

In the method of operating the terminal apparatus 200, when an uplink packet of service flow 1 is transmitted, the terminal apparatus 200 applies QoS parameter 1 mapped to service flow 1 to the uplink packet of service flow 1 and transmits the uplink packet with particular QoS defined for service flow 1 in S250.

That is, in the method of operating the terminal apparatus 200, when the uplink packet is to be transmitted, the terminal apparatus 200 identifies the service flow on the basis of 5-tuple identified from a header of the uplink packet to be transmitted.

For example, in the method of operating the terminal apparatus 200, when service flow 1 is identified, the terminal apparatus 200 may apply QoS parameter 1 mapped to service flow 1 to this uplink packet and transmit the uplink packet of service flow 1 with particular QoS defined for service flow 1.

As illustrated in FIG. 2, it is assumed that service flows 1, 2, 3, and 4 are generated for terminal apparatus 200 when the terminal apparatus 200 uses communication services 1, 2, 3, and 4.

In this case, the terminal apparatus 200 according to the present disclosure may apply QoS parameter 1 (QoS level 1) defined for service flow 1 of the packet of communication service 1 to the corresponding packet and transmit the corresponding packet, apply QoS parameter 2 (QoS level 2) defined for service flow 2 of the packet of communication service 2 to the corresponding packet and transmit the corresponding packet, apply QoS parameter 3 (QoS level 3) defined for service flow 3 of the packet of communication service 3 to the corresponding packet and transmit the corresponding packet, and apply QoS parameter 4 (QoS level 4) defined for service flow 4 of the packet of communication service 4 to the corresponding packet and transmit the corresponding packet, so as to transmit the packets at guaranteed QoS levels based on service flows.

At this time, in the method of operating the terminal apparatus 200, the terminal apparatus 200 may acquire and identify information (QoS control information) required for the service flow-based QoS control from the header of the downlink packet without separate signaling and transmit the packet at the guaranteed QoS level based on service flow based on the acquired information.

As described above with reference to FIGS. 3 and 4, according to the service flow-based QoS control method according to the present disclosure, when the service flow-based QoS control is performed for downlink traffic and the QoS control information is transmitted to the terminal in the form of Piggyback in which the QoS control information is inserted into a header of a particular packet of downlink traffic, the terminal performs the service flow-based. QoS control for uplink traffic, which is the same as that of downlink traffic.

Hereinafter, the QoS control method (interworking QoS control methods between systems before and after a handover) according to the present disclosure will be described in a viewpoint of the BS.

Accordingly, for convenience of description, the QoS control method according to the present disclosure will be described by describing a method of operating a BS apparatus 100 hereinafter.

In the method of operating the BS apparatus 100, when the terminal 200 hands over to an LTE network supporting a QoS control policy, that is, a bearer-based QoS control policy (control method) different from that of the BS apparatus 100 in S150, a service type of a communication service used by the terminal 200 is identified.

In the method of operating the BS apparatus 100, when the service type of the communication service used by the terminal 200 is a type in which guarantee of session continuity is important such as a VoIP or a video call, it is determined that the service requires continuity of the service flow (Yes of S160).

In the method of operating the BS apparatus 100, when continuity of the service flow for the terminal 200 is required (Yes of S160), QoS conversion information is provided to the terminal 200, where the QoS conversion information is for converting the QoS parameter of the service flow into a QoS parameter according to the bearer-based QoS control method.

For example, the BS apparatus 100 selects a target cell to which the terminal 200 hands over through interworking with a network (not shown) and provides a policy and an instruction (hereinafter, referred to as handover information) required for the handover to the terminal 200, thereby allowing the terminal 200 to perform the handover to the target cell from the current call (the BS apparatus 100) based on the handover information.

At this time, in the method of operating the BS apparatus 100, when the handover information is provided to the terminal 200, QoS conversion information is also provided. And then a session with the terminal 200 is released in conventional way in S180.

Meanwhile, in the method of operating the BS apparatus 100, when continuity of the service flow for the terminal 200 is not required (No of S160), QoS conversion information is not provided to the terminal 200.

For example, in the method of operating the BS apparatus 100, the handover information is provided to the terminal 200 and then the session with the terminal 200 is released in conventional way in S170.

Then, in the method of operating the BS apparatus 100, when the terminal 200 hands over to the LTE network supporting the hearer-based QoS control method, the BS apparatus 100 may selectively provide QoS conversion information according to whether continuity of the service flow for the terminal 200 is required, that is, according to sensitivity of the communication service, thereby preventing a load increase due to an unnecessary additional processing process.

That is, in the method of operating the BS apparatus 100, it is possible to minimize disconnection of the communication service of the terminal due to the handover through interworking between QoS control methods of systems before and after a handover. The interworking of QoS control methods between systems before and after a handover can be selectively applied according to sensitivity of the communication service (according to whether continuity of the service flow is required).

Figure 6:
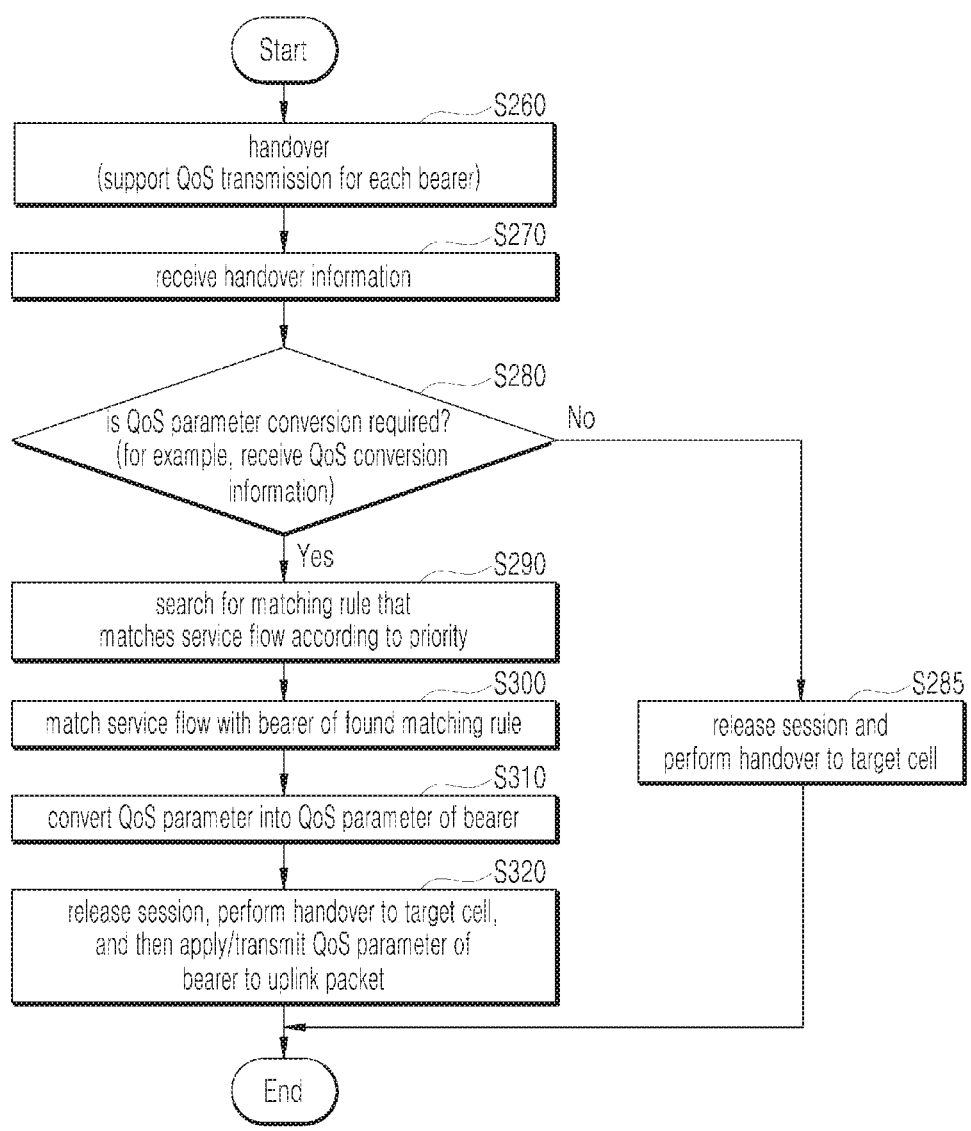
FIG. 6 is a control flowchart illustrating a QoS control method (interworking between QoS control methods of systems before and after a handover) in a viewpoint of the terminal according to an embodiment of the present disclosure.

Hereinafter, the QoS control method according to the present disclosure (interworking between QoS control methods of systems before and after a handover) will be described in a viewpoint of the terminal with reference to FIG. 6.

Accordingly, for convenience of description, the QoS control method according to the present disclosure will be described by describing a method of operating the terminal apparatus 200.

In the method of operating the terminal apparatus 200, when a handover requirement condition is met and the handover is to be performed in S260, handover information may be received from the BS 100 in S270.

At this time, in the method of operating the terminal apparatus 200, when the handover information is received together with QoS conversions information, it is determined that QoS parameter conversion is needed (Yes of S280).

As described above, the QoS conversion information includes a matching rule for each service flow by which each service flow is mapped to the bearer, a priority of the matching rule for each service flow, and a QoS parameter defined for each bearer.

The priority of the matching rule for each service flow is determined on the basis of a QoS level of each service flow.

Specifically, in the matching rule for each service flow, the matching rule of a particular service flow may be determined to have a priority which is the same as or higher than a matching rule of a service flow having a QoS level lower than that of the particular service flow.

For example, in the matching rule for each service flow, a matching rule of service flow 1 by which service flow 1 is mapped to the bearer is determined to have a priority which is the same as or higher than a matching rule of a service flow having a QoS level lower than that of service flow 1.

In other words, the priority of the matching rule for each service flow becomes lower in the descending order of QoS levels of the service flows.

Further, the matching rule for each service flow may include a search factor for searching for a matching rule that matches the corresponding service flow. The search factor may be defined as 5-tuple (the source IP, the destination IP, the source port, destination port, and the protocol ID) which is the criterion for determining service flows.

A QoS parameter conversion process is described below in more detail.

In the method of operating the terminal apparatus 200, with respect to the service flow of the previously stored service flow and QoS parameter mapping information, the terminal apparatus 200 searches for a matching rule that matches the service flow (search factor) from matching rules for respective service flows based on the QoS conversion information in an order from a matching rule having the highest priority to a matching rule having the lowest priority in S290.

Mapping information of service flow 1 and QoS parameter 1 is described by way of an example. In the method of operating the terminal apparatus 200, the terminal apparatus 200 compares service flow 1 (the source IP, the destination IP, the source port, the destination port, and the protocol ID) and a search factor (the source IP, the destination IP, the source port, the destination port, and the protocol ID) of matching rule 2 (refer to Table 2) having the highest priority among the matching rules for respective service flows and identifies whether they match each other. When they match each other, the terminal apparatus 200 determines that matching rule 2 is a matching rule that matches service flow 1 in the method of operating the terminal apparatus 200.

When they do not match each other, the terminal apparatus 200 compares service flow 1 (the source IP, the destination IP, the source port, the destination port, and the protocol ID) and a search factor (the source IP, the destination IP, the source port, the destination port, and the protocol ID) of matching rule 3 (refer to Table 2) having the next highest priority among the matching rules for respective service flows and identifies whether they match each other in the method of operating the terminal apparatus 200.

As described above, in the method of operating the terminal apparatus 200, with respect to a service flow of a communication service which is being used, the terminal apparatus 200 searches for a matching rule that matches the service flow (search factor) priority among the matching rules for respective service flows according to an order from a matching rule having the highest priority to a matching rule having the lowest.

In the method of operating the terminal apparatus 200, since the terminal apparatus 200 may identify and search for matching rules from the matching rule having the highest priority, in other words, the highest QoS level in the QoS parameter conversion, thereby increasing a QoS parameter conversion speed and capability.

Hereinafter, for convenience of description, it is assumed that matching rule 2 is found as the matching rule that matches service flow 1.

In this case, in the method of operating the terminal apparatus 200, the terminal apparatus 200 matches service flow 1 with a bearer (for example, bearer 1) according to found matching rule 2 in S300 and convert QoS parameter 1 of service flow 1 into a QoS parameter (for example, QoS parameter A) defined for the matched bearer (for example, bearer 1) in S310.

In the method of operating the terminal apparatus 200, when no matching rule that matches service flow 1 is found among the matching rules for respective service flows, the terminal apparatus 200 may match service flow 1 (communication service 1) with a default bearer.

As described above, in the method of operating the terminal apparatus 200, during a handover process, the terminal apparatus 200 may convert the QoS parameter (for example, QoS parameter 1) according to the service flow-based QoS control method, which the terminal apparatus 200 possesses (maps stores) into the QoS parameter (for example, QoS parameter A) according to the bearer-based QoS control method.

Of course, in the method of operating the terminal apparatus 200, the terminal apparatus 200 may perform the conventional handover process such as releasing a session with the BS 100 and performing the handover to the target cell, separately from the QoS parameter conversion in S320.

In the method of operating the terminal apparatus 200, after the handover to the target cell, the terminal apparatus 200 may transmit uplink packets at the guaranteed QoS level based on bearers to which the service flows (communication services) are mapped according to the conventional bearer-based QoS control method in S320.

Meanwhile, in the method of operating the terminal apparatus 200, when it is determined that the QoS parameter conversion is not needed (No of S280), the terminal apparatus 200 performs the conventional handover process such as releasing a session with the BS 100 and performing the handover to the target cell in S285.

As described above, the present disclosure has an effect of informing the terminal of information (QoS control information) required for the service flow-based QoS control) without separate signaling for performing the service flow-based QoS control, an effect of increasing packet inspection efficiency by transmitting QoS control information in the form of Piggyback, an effect of minimizing disconnection of the communication service of the terminal in the handover by enabling interworking between QoS control methods of systems before and after a handover, and an effect of selectively reflecting the interworking between QoS control methods of systems before and after a handover according to sensitivity of the communication service.

Hereinafter, the apparatus for implementing the service flow-based QoS control method proposed by the present disclosure, that is, the BS apparatus and the terminal apparatus will be described in detail.

The configuration of the BS apparatus according to an exemplary embodiment of the present disclosure will be first described with reference to FIG. 7.

Figure 7:
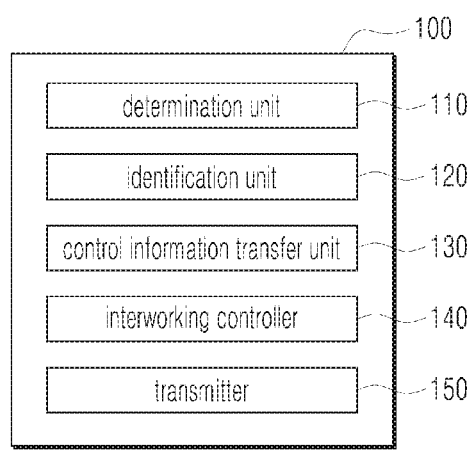
FIG. 7 is a block diagram illustrating the configuration of the BS apparatus according to an embodiment of the present disclosure.

As illustrated in FIG. 7, the BS apparatus 100 according to the present disclosure includes a determination unit 110 configured to determine service flows for downlink packets to be transmitted to the terminal, an identification unit 120 configured to identify a particular QoS parameter defined in the service flow among QoS parameters defined for respective service flows, and a transmission unit 150 configured to apply the particular QoS parameter to the downlink packet and transmit the downlink packet to the terminal with particular QoS defined in the service flow.

Hereinafter, for convenience of description, the terminal is referred to as the terminal apparatus 200 of FIG. 2.

The determination unit 110 determines service flows for downlink packet to be transmitted to the terminal 200.

That is, when the downlink packet to be transmitted to the terminal 200 is transferred from the network (not shown), the determination unit 110 identities the service flow of the downlink packet on the basis of information identified from a header of the downlink packet.

At this time, the downlink packet may have the form of an 1P-based packet to which is a 5-tuple rule is applied for the QoS control.

Accordingly, the determination unit 110 may identify the service flow on the basis of 5-tuple identified from the header of the downlink packet, that is, a source IP, a destination IP, a source port, a destination port, and a protocol ID.

Hereinafter, for convenience of description, it is assumed that this service flow of the downlink packet is classified as service flow 1.

The identification unit 120 identifies a particular QoS parameter defined in a service flow identified this time among the QoS parameters predefined for respective service flows.

For example, the identification unit 120 identifies a particular QoS parameter defined for service flow 1 among the QoS parameters predefined for respective service flows.

At this time, the identification unit 120 may possess the QoS parameters predefined for respective service flows and search for and identify the particular QoS parameter defined for service flow 1 among the possessed QoS parameters of respective service flows.

Alternatively, the identification unit 120 may do not possess the QoS parameters for respective service flows and may acquire and identify the particular QoS parameter defined for service flow 1 from separate network equipment (for example, a P-GW) during a process in which the terminal 200 connects a session to use communication service 1 (service flow 1).

The QoS parameter may be defined as one or more of pieces of information shown in [Table 1] below.

TABLE 1

| Parameter | Meaning |
| --- | --- |
| QoS Type | Indicates whether service type is Guaranteed Bit Rate (GBR) or non-GBR |
| Bitrate | GBR for service flow when QoS type is GBR, When QoS type is non-GBR, it can be omitted, or allowed maximum bit rate if set |
| Priority | Relative priority of service flows (scheduling or resource allocation is preferentially considered as priority is higher) |
| Timer | QoS parameter is invalid when timer expires |

Hereinafter, for convenience of description, the QoS parameter defined for service flow 1 is referred to as QoS parameter 1.

When transmitting the downlink packet, the transmission unit 150 applies the particular QoS parameter (for example, QoS parameter 1) identified by the identification unit 120 to the downlink packet and transmits the downlink packet to the terminal 200 with particular QoS defined for service flow 1.

That is, when transmitting the downlink packet, the transmission unit 150 transmits the downlink packet at the guaranteed QoS level based on service flows by applying the QoS parameter (QoS level) defined in the service flow of the corresponding packet to the downlink packet and transmitting the downlink packet.

In the above, the service flow-based QoS control method according to the present disclosure has been described based on downlink traffic.

In order to apply the service flow-based QoS control method according to the present disclosure to uplink traffic, a process of informing the terminal of information (QoS control information) required for the service flow-based QoS control is required.

However, if a separate control method is used during the process, the control message should be transmitted and received whenever a new service flow is generated and thus complexity of the QoS control may increase compared to the exiting bearer-based QoS control method.

Hereinafter, the present disclosure proposes a method of informing the terminal of information (QoS control information) required for the service flow-based QoS control without using a separate control message (separate signaling).

Specifically, as illustrated in FIG. 7, the BS apparatus 100 according to the present disclosure further includes a control information transfer unit 130.

The control information transfer unit 130 may insert the QoS control information for identifying a particular QoS parameter into a header of a particular downlink packet according to a service flow and allow the terminal 200 to transmit an uplink packet of the service flow with particular QoS on the basis of the QoS control information.

That is, the control information transfer unit 130 may inform the terminal 200 of the QoS control information by inserting the QoS control information into the header of the particular downlink packet among the downlink packets according to the service flow, for example, service flow 1.

At this time, the QoS control information includes identification information for identifying whether the packet is a packet including the QoS parameter and a particular QoS parameter (for example, QoS parameter 1) defined in the service flow (for example, service flow 1).

Further, the particular downlink packet is at least one downlink packet among a downlink packet in the case in which the service flow is initiated and a downlink packet in the case in which the QoS parameter of the service flow is changed while the service flow is maintained.

For example, the control information transfer unit 130 may insert the QoS control information into the header of the particular downlink packet of the time point at which service flow 1 for the terminal 200 is initiated since the terminal 200 uses communication service 1.

Alternatively, the control information transfer unit 130 may insert, the QoS control information into the header of the particular downlink packet of the time point at which QoS parameter 1 of service flow 1 is changed while service flow 1 for the terminal 200 is maintained since the terminal 200 continues using communication service 1.

It is preferable that the header into which the QoS control information is inserted is a header which is first processed when being received, for example, a Layer (L) 2 header in a structure of the packet.

Then, since the terminal 200 receiving the particular downlink packet can know the information (QoS control information) required for the service flow-based QoS control from the header of the particular downlink packet, the terminal 200 may transmit the uplink packet at the guaranteed QoS level based on service flows on the basis of the information.

As described above, according to the present disclosure, the terminal may be informed of the information (QoS control information) required for the service flow-based QoS control without using a separate control message (separate signaling).

Meanwhile, the BS apparatus 100 for implementing the service flow-based QoS control method may be located in an area which overlaps the LIE network supporting another QoS control policy, for example, the conventional bearer-based QoS control method in which case the terminal 200 may be handed over to the LTE network.

In this case, since QoS control methods between systems before/after the handover are different, it may be impossible to provide the QoS control while seamlessly providing a communication service to the terminal 200 in the system after the handover.

Accordingly, the present disclosure proposes a method of enabling interworking between QoS control methods of systems before and after a handover in consideration of the case in which the terminal is handed over to the network supporting the exiting bearer-based QoS control method.

Specifically, as illustrated in FIG. 7, the BS apparatus 100 according to the present disclosure further includes an interworking controller 140.

When the terminal 200 is handed over to another network supporting a QoS control policy different from that of the BS apparatus 100, the interworking controller 140 provides QoS conversion information for converting the particular QoS parameter into a QoS parameter according to the different QoS control policy to the terminal 200.

That is, when the terminal 200 is handed over to the LIE network supporting the QoS control policy different from that of the BS apparatus 100, that is, the bearer-based QoS control policy (method), the interworking controller 140 provides the QoS conversion information for converting QoS parameter 1 of service flow 1 into the QoS parameter according to the bearer-based QoS control method to the terminal 200.

More specifically, when the terminal 200 satisfies a handover requirement condition and the BS apparatus 100 determines that the handover of the terminal 200 is needed, the BS apparatus 100 selects a target cell to which the terminal 200 is handed over through interworking with the network (not shown) and provides a policy and an instruction (hereinafter, referred to as handover information) required for the handover to the terminal 200 and thus allows the terminal 200 to hand over to the target cell from the current cell (BS apparatus 100) on the basis of the handover information.

At this time, in the case in which the terminal 200 is handed over to the LTE network supporting the bearer-based QoS control method, the interworking controller 140 also provides QoS conversion information when providing the handover information to the terminal 200.

The QoS conversion information includes a matching rule for each service flow by which each service flow matches the bearer, a priority of the matching rule for each service flow, and a QoS parameter defined for each bearer.

The priority of the matching rule for each service flow is determined on the basis of a QoS level of each service flow.

As described above, the reason why the priority of the matching rule for each service flow is determined on the basis of the QoS level will be mentioned in detail in the description for the terminal apparatus according to the present disclosure.

Accordingly, during the process of receiving the handover information and performing the handover to the target cell from the current call (BS apparatus 100) on the basis of the handover information, the terminal 200 may convert the QoS parameter according to the service flow-based QoS control method which the terminal 200 possesses (maps/stores) into the QoS parameter according to the bearer-based QoS control method on the basis of the QoS conversion information.

According to the present disclosure, when the terminal is handed over from the system according to the service flow-based QoS control method to the hearer-based QoS control method, it is possible to minimize disconnection of the communication service of the terminal during the handover by transmitting information for converting (matching) the service flow-based QoS parameter into the bearer-based QoS parameter to the terminal.

When the QoS parameter is converted during the handover of the terminal 200, an additional process to be processed is needed in comparison with the case in which the QoS parameter is not converted. The additional process to be processed may result in increasing the load during the handover even though the load for the additional process would be small to the terminal 200.

Meanwhile, when the terminal 200 uses only a communication service such as an Internet search or email service for which guarantee of session continuity is not important, a user of the terminal 200 may be influenced a little even though the communication is somewhat disconnected due to the handover of the terminal 200 to the LIE network supporting the bearer-based QoS control method.

Accordingly, in such a situation, the conversion of the QoS parameter may be rather unnecessary during the process in which the terminal 200 performs the handover.

When the terminal 200 hands over to the LTE network supporting the bearer-based QoS control method, the interworking controller 140 may provide the QoS conversion information only when continuity of the service flow for the terminal 200 is required.

At this time, the service flow requiring continuity may vary depending on advance definition and may be defined as, for example, a service flow of the communication service such as a VoIP or a video call considering guarantee of session continuity important.

Then, when the terminal 200 hands over to the LTE network supporting the bearer-based QoS control method, the interworking controller 140 may selectively provide QoS conversion information according to whether continuity of the service flow for the terminal 200 is required, that is, according to sensitivity of the communication service, thereby preventing a load increase due to an unnecessary additional processing process.

As described above, the BS apparatus 100 according to the present disclosure may implement the service flow-based QoS control method having a function of informing the terminal of information (QoS control information) required for the service flow-based QoS control without separate signaling and a function of enabling interworking between QoS control methods of systems before and after the handover but selectively reflecting the QoS control method according to sensitivity of the communication service, so as to apply differential QoS, that is, service qualities to communication services without increasing complexity compared to the conventional bearer-based QoS control method.

Figure 8:
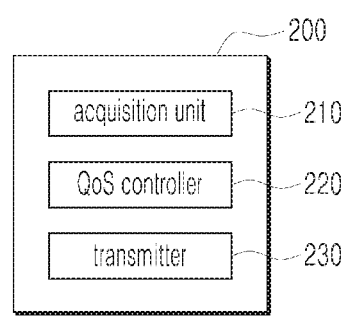
FIG. 8 is a block diagram illustrating the configuration of the terminal apparatus according to an embodiment of the present disclosure.

Hereinafter, the configuration of the terminal apparatus according to an exemplar embodiment of the present disclosure will be described with reference to FIG. 8.

Figure 4:
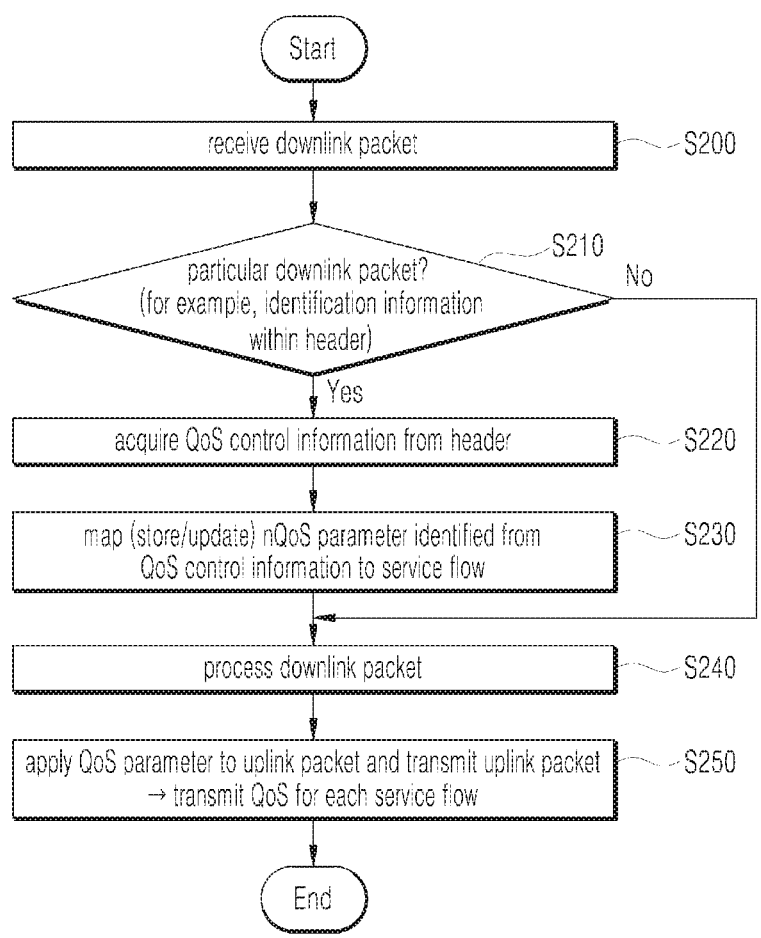
FIG. 4 is a control flowchart illustrating a QoS control method (service flow-based QoS control) in a viewpoint of a terminal according to an embodiment of the present disclosure.
Figure 5:
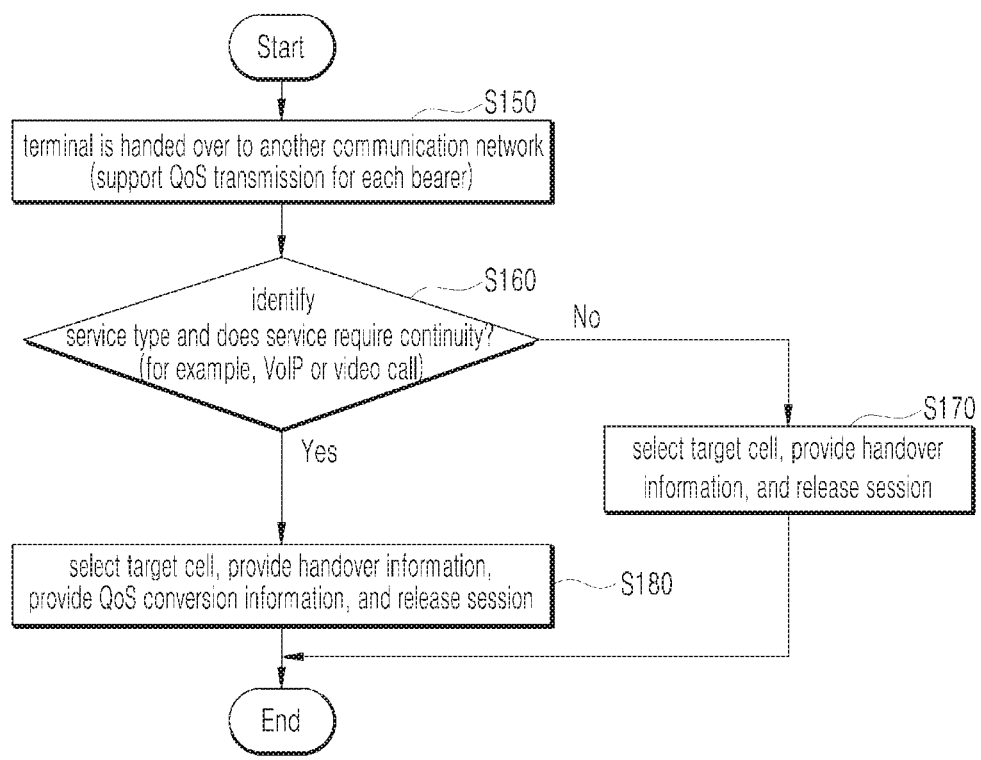
FIG. 5 is a control flowchart illustrating a QoS control method (interworking between QoS control methods of systems before and after a handover) in a viewpoint of the BS according to an embodiment of the present disclosure.

As illustrated in FIG. 4, the terminal apparatus 200 according to the present disclosure includes an acquisition 210 configured to acquire QoS control information from a header of a particular downlink packet among the downlink packets received from the BS, a QoS controller 20 configured to map a particular QoS parameter identified from the QoS control information to a service flow of the particular downlink packet, and a transmitter 230 configured to apply the particular QoS parameter to the uplink packet of the service flow and transmit the uplink packet with particular QoS defined in the service flow.

Hereinafter, for convenience of description, the BS is referred to as the BS apparatus 100 of FIG. 2 and the following description will be made based on service flow 1 according to the use of communication service 1.

The acquisition unit 210 acquires QoS control information from the header of the particular downlink packet among the downlink packets received from the BS 100.

As described above, the QoS control information includes identification information for identifying whether the packet is a packet including the QoS parameter and a particular QoS parameter example, QoS parameter 1) defined in a service flow (for example, service flow 1).

When the downlink packet is received from the BS 100, the acquisition unit 210 identifies a field in which identification information is recorded in the header of the downlink packet, more specifically an L2 header, and when there is the identification information, identifies whether the downlink packet received this time is the particular downlink packet including the QoS parameter based on the identification information.

When it is identified that the downlink packet received this time is the particular downlink packet, the acquisition unit 210 may acquire QoS control information from the header of the corresponding downlink packet, more specifically, the L2 header.

When the acquisition unit 210 acquires the QoS control information, the QoS controller 220 may identify the service flow of the particular downlink packet on the basis of 5-tuple identified from the header of the particular downlink packet.

As described in the example, it is assumed that the BS 100 identifies service flow 1 and the QoS control information for identifying QoS parameter 1 defined for service flow 1 is inserted into the header of the particular downlink packet and then transmitted.

In this case, the QoS controller 220 may identify service flow 1 on the basis of 5-tuple identified form the header of the particular downlink packet.

The QoS controller 220 maps QoS parameter 1 identified from the previously acquired QoS control information service flow 1 of the particular downlink packet.

At this time, the QoS controller 220 may store service flow and QoS parameter mapping information generated by mapping QoS parameter a to service flow 1 may be stored in service flow 1 by mapping QoS parameter 1 to 5-tuple (the source IP, the destination IP, the source port, the destination port, and the protocol ID) which is the criterion for identifying service flow 1.

When the QoS control information is acquired from the header of the particular downlink packet of the time point at which service flow 1 of the terminal apparatus 200 is initiated and QoS parameter 1 is mapped to service flow 1, it means that new service flow and QoS parameter mapping information is stored.

On the other hand, when the QoS control information is acquired from the header of the particular downlink packet of the time point at which QoS parameter 1 of service flow 1 is changed while service flow 1 for the terminal apparatus 200 is maintained and QoS parameter 1 is mapped to service flow 1, it means that the conventionally stored service flow and QoS parameter mapping information is updated and stored.

The transmitter 230 applies the particular QoS parameter mapped to service flow 1 to the uplink packet of service flow 1 and transmits the uplink packet with particular QoS defined for service flow 1.

That is, when service flow 1 is identified on the basis of 5-tuple identified from the header of the uplink packet to be transmitted, the transmitter 230 may apply QoS parameter 1 mapped to service flow 1 to the corresponding uplink packet and transmit the uplink packet of service flow 1 with QoS defined for service flow 1.

As described above, the terminal apparatus 200 according to the present disclosure may acquire and know information (QoS control information) required for the service flow-based QoS control from the header of the downlink packet without separate signaling and transmit the packet at the guaranteed QoS level based on service flows based on the acquired information.

Further, when the terminal apparatus 200 is handed over from the BS 100 to the network supporting the conventional bearer-based QoS control method, the configuration in which the terminal apparatus 200 operates through interworking between QoS control methods of systems before and after the handover will be described below.

When the terminal apparatus 200 is handed over to another network supporting a QoS control policy different from that of the BS 100, the terminal apparatus 200, that is, the QoS controller 220 converts the particular QoS parameter into a QoS parameter according to the different QoS control policy based on the QoS conversion information provided from the BS 100.

More specifically, when the terminal apparatus 200 satisfies a handover requirement condition and the BS 100 determines that the handover of the terminal apparatus 200 is needed, the BS 100 selects a target cell to which the terminal apparatus 200 is handed over through interworking with the network (not shown) and provides a policy and an instruction (hereinafter, referred to as handover information) required for the handover to the terminal apparatus 200 and thus allows the terminal apparatus 200 to hand over to the target cell from the current cell (BS 100) on the basis of the handover information.

At this time, in the case in which the terminal apparatus 200 is handed over to the LTE network supporting the bearer-based QoS control method, the BS 100 also provides QoS conversion information when providing the handover information to the terminal apparatus 200.

Accordingly, when the terminal apparatus 200 is handed over to the LTE network supporting the QoS control policy different from that of the BS 100, that is, the bearer-based QoS control policy (control method), the QoS controller 220 of the terminal apparatus 200 receives the QoS conversion information from the BS 100.

Thereafter, the QoS controller 220 converts the particular QoS parameter (for example, QoS parameter 1 of service flow 1) into a QoS parameter according to the bearer-based QoS control method based on the QoS conversion information.

As described above, the QoS conversion information includes a matching rule of each service flow by which each service flow is mapped to the bearer, a priority of the matching rule of each service flow, and a QoS parameter defined for each bearer.

The priority of the matching rule of each service flow is determined on the basis of a QoS level of each service flow.

Specifically, in the matching rule of each service flow, the matching rule of a particular service flow may be determined to have a priority which is the same as or higher than a matching rule of a service flow having a QoS level lower than that of the particular service flow.

For example, in the matching rule of each service flow, a matching rule of service flow 1 by which service flow 1 is mapped to the bearer is determined to have a priority which is the same as or higher than a matching rule of a service flow having a QoS level lower than that of service flow 1.

In other words, the priority of the matching rule of each service flow becomes lower in the descending order of QoS levels of the service flows.

Further, the matching rule for each service flow may include a search factor for searching for a matching rule that matches the corresponding service flow, and the search factor may be defined as 5-tuple (the source IP, the destination IP, the source port, destination port, and the protocol ID) which is the criterion for determining service flows.

The QoS conversion information may be defined as [Table 2] and [Table 3] below.

TABLE 2

| Matching rule | Priority | Search factor (mapping criteria) | Bearer ID |
|---|---|---|---|
| 1 | 3 | Source IP, Destination IP, Source Port, Destination Port, Protocol ID | 1 |
| 2 | 1 | Source IP, Destination IP, Source Port, Destination Port, Protocol ID | 1 |
| 3 | 2 | Source IP, Destination IP, Source Port, Destination Port, Protocol ID | 3 |
| ... | ... | ... | ... |

TABLE 3

| Bear ID | Bear context | Bear type |
|---|---|---|
| 1 | QCI, ARP, ... | Default or Dedicated |
| 2 | QCI, ARP, ... | Default or Dedicated |
| ... | ... | ... |

[Table 2] shows a matching rule for each service flow and a priority of each matching rule, and [Table 3] shows a QoS parameter (bearer context and type) defined for each bearer.

A QoS parameter conversion process is described below in more detail.

With respect to the service flow of the previously stored service flow and QoS parameter mapping information, the QoS controller 20 searches for a matching rule that matches a service flow (search factor) in an order from a matching rule having the highest priority to a matching rule having the lowest priority among the matching rules for respective service flows based on the QoS conversion information.

Mapping information of service flow 1 and QoS parameter 1 is described by way of an example. The QoS controller 220 compares service flow 1 (the source the destination IP, the source port, the destination port, and the protocol ID) and a search factor (the source IP, the destination IP, the source port, the destination port, and the protocol ID) of matching rule 2 having the highest priority among the matching rules for respective service flows and identifies whether they match each other. When they match each other, matching rule 2 is found as a matching rule that matches service flow 1 in the method of operating the terminal apparatus 200.

When they do not match each other, the QoS controller 220 compares service flow 1 (the source IP, the destination IP, the source port, the destination port, and the protocol ID) and a search factor (the source IP, the destination IP, the source port, the destination port, and the protocol ID) of matching rule 3 having the next highest priority after matching rule 2 among the matching rules of respective service flows and identifies whether they match each other.

As described above, with respect to the service flow of the communication service being used, the QoS controller 220 searches for a matching rule that matches the service flow (search factor) in an order from a matching rule having the highest priority to a matching rule having the lowest priority among the matching rules for respective service flows.

Since the terminal apparatus 200 can identify and search for matching rules from the matching rule having the highest priority, in other words, the highest QoS level in the QoS parameter conversion, thereby increasing a QoS parameter conversion speed and capability.

Hereinafter, for convenience of description, it is assumed that matching rule 2 is found as the matching rule that matches service flow 1.

In this case, the QoS controller 220 matches service flow 1 with the bearer (for example, bearer 1) according to found matching rule 2 and converts QoS parameter 1 of service flow 1 into a QoS parameter (for example, QoS parameter A) defined in the matched bearer (for example, bearer 1).

If no matching rule that matches service flow 1 among the matching rules for respective service flows is found, the QoS controller 220 may match service flow 1 (communication service 1) with a default bearer.

As described above, during a handover process, the terminal apparatus 200 may convert the QoS parameter (for example, QoS parameter 1) according to the service flow-based QoS control method, which the terminal apparatus 200 possesses (maps/stores) into the QoS parameter (for example, QoS parameter A) according to the bearer-based QoS control method based on the QoS conversion information.

After the handover to the target cell, the terminal apparatus 200 may transmit uplink packets at the guaranteed QoS level based on bearers to which the service flows (communication services) are mapped according to the conventional hearer-based QoS control method.

As described above, the terminal apparatus 200 according to the present disclosure may implement the service flow-based QoS control method having a function of providing the terminal with information (QoS control information) required for the service flow-based QoS control without separate signaling and a function of enabling interworking between QoS control methods of systems before and after the handover but selectively reflecting the QoS control method according to sensitivity of the communication service, so as to apply differential QoS, that is, service qualities to communication services without increasing complexity compared to the conventional bearer-based QoS control method.

The implementations of the functional operations and subject matter described in the present disclosure may be realized by a digital electronic circuit, by the structure described in the present disclosure, and the equivalent including computer software, firmware, or hardware including, or by a combination of one or more thereof. Implementations of the subject matter described in the specification may be implemented in one or more computer program products, that is, one or more modules related to a computer program command encoded on a tangible program storage medium to control an operation of a processing system or the execution by the operation.

A computer-readable medium may be a machine-readable storage device, a machine-readable storage substrate, a memory device, a composition of materials influencing a machine-readable radio wave signal, or a combination of one or more thereof.

In the specification, the term "system" or "device", for example, covers a programmable processor, a computer, or all kinds of mechanisms, devices, and machines for data processing, including a multiprocessor and a computer. The processing system may include, in addition to hardware, a code that creates an execution environment for a computer program when requested, such as a code that constitutes processor firmware, a protocol stack, a database management system, an operating system, or a combination of one or more thereof.

A computer program (also known as a program, software, software application, script, or code) can be written in any form of programming language, including compiled or interpreted languages, declarative or procedural languages, and it can be deployed in any form, including as a stand-alone program or module, a component, subroutine, or another unit suitable for use in a computer environment. A computer program may, but need not, correspond to a file in a file system. A program can be stored in a single file provided to the requested program, in multiple coordinated files (for example, files that store one or more modules, sub-programs, or portions of code), or in a portion of a file that holds other programs or data (for example, one or more scripts stored in a markup language document). A computer program can be deployed to be executed on one computer or on multiple computers that are located at one site or distributed across a plurality of sites and interconnected by a communication network.

A computer-readable medium suitable for storing a computer program command and data includes all types of non-volatile memories, media, and memory devices, for example, a semiconductor memory device such as an EPROM, an EEPROM, and a flash memory device, and a magnetic disk such as an external hard disk or an external disk, a magneto-optical disk, a CD-ROM, and a DVD-ROM disk. A processor and a memory may be added by a special purpose logic circuit or integrated into the logic circuit.

The implementations of the subject matter described in the specification may be implemented in a calculation system including a back-end component such as a data server, a middleware component such as an application server, a front-end component such as a client computer having a web browser or a graphic user interface which can interact with the implementations of the subject matter described in the specification by the user, or all combinations of one or more of the back-end, middleware, and front-end components. The components of the system can be mutually connected by any type of digital data communication such as a communication network or a medium.

While the specification contains many specific implementation details, these should not be construed as limitations to the scope of any disclosure or of what may be claimed, but rather as descriptions of features that may be specific to particular embodiments of particular disclosures. Certain features that are described in the specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In addition, in the specification, the operations are illustrated in a specific sequence in the drawings, but it should be understood that the operations are not necessarily performed in the shown specific sequence or that all shown operations are necessarily performed in order to obtain a preferable result. In a specific case, multitasking and parallel processing may be preferable. Furthermore, it should not be understood that a separation of the various system components of the above-mentioned implementation is required in all implementations. In addition, it should be understood that the described program components and systems usually may be integrated in a single software package or may be packaged in a multi-software product.

As described above, specific terms disclosed in the specification do not intend to limit the present disclosure. Therefore, while the present disclosure was described in detail with reference to the above-mentioned examples, a person skilled in the art may modify, change, and transform some parts without departing a scope of the present disclosure. The scope of the present disclosure is defined by the appended claims to be described later, rather than the detailed description. Accordingly, it will be appreciated that all modifications or variations derived from the meaning and scope of the appended claims and their equivalents are included in the range of the present disclosure.

What is claimed is:

1. A Base Station (BS) apparatus comprising:
a determination unit configured to determine service flow for downlink packets to be transmitted to a terminal;
an identification unit configured to identify a particular Quality of Service (QoS) parameter defined for the service flow from QoS parameters defined for each of service flows;
a transmitter configured to apply the particular QoS parameter to the downlink packet and transmit the downlink packet to the terminal with particular QoS for the service flow; and
an interworking controller configured to, when the terminal is handed over to another network supporting a QoS control policy different from that of the BS apparatus, provide QoS conversion information for converting the particular QoS parameter into a QoS parameter according to the different QoS control policy to the terminal.

2. The BS apparatus of claim 1, further comprising a control information transfer unit configured to insert QoS control information for identifying the particular QoS parameter into a header of a particular downlink packet of the service flow, thereby allowing the terminal to transmit an uplink packet of the service flow with the particular QoS based on the QoS control information.

3. The BS apparatus of claim 2, wherein the particular downlink packet includes at least one of a downlink packet related to initiation of the service flow and a downlink packet related to change of the QoS parameter of the service flow while the service flow is maintained.

4. The BS apparatus of claim 1, wherein the different QoS control policy is bearer-based QoS control policy for guaranteeing different QoS levels for each of bearers.

5. The BS apparatus of claim 1, wherein the QoS conversion information includes a matching rule for each service flow by which a service flow matches a bearer, a priority of the matching rule for each service flow, and a QoS parameter predefined for each bearer.

6. The BS apparatus of claim 5, wherein the priority of the matching rule for each service flow is determined based on the QoS level of each service flow.

7. The BS apparatus of claim 1, wherein the interworking controller provides the QoS conversion information only when continuity of the service flow is required.

8. A terminal apparatus comprising:
an acquisition unit configured to acquire QoS control information from a header of a particular downlink packet of downlink packets received from a Base Station (BS);
a QoS controller configured to map a particular QoS parameter identified from the QoS control information to a service flow of the particular downlink packet; and
a transmitter configured to apply the particular QoS parameter to an uplink packet of the service flow and transmit the uplink packet with particular QoS defined in the service flow,
wherein, when a handover is performed to another network supporting a QoS control policy different from that of the BS, the QoS controller converts the particular QoS parameter into a QoS parameter according to the different QoS control policy based on QoS conversion information provided from the BS.

9. The terminal apparatus of claim 8, wherein the QoS conversion information includes a matching rule for each service flow by which a service flow matches a bearer, a priority of the matching rule for each service flow, and a QoS parameter predefined for each bearer, and
the QoS controller is configured to search for a matching rule that matches the service flow from the matching rule for each service flow based on the QoS conversion information in an order from a matching rule having the highest priority to a matching rule having the lowest priority, match the service flow to a bearer of the found matching rule, and convert the particular QoS parameter into a QoS parameter defined in the matched bearer.

10. A method of controlling QoS, the method comprising:
determining service flow for downlink packet to be transmitted to a terminal by a Base Station (BS) apparatus;
identifying a particular Quality of Service (QoS) parameter defined for the service flow from QoS parameters defined for each of service flows by the BS apparatus;
applying the particular QoS parameter to the downlink packet and transmit the downlink packet to the terminal with particular QoS for service flow by the BS apparatus; and
providing, when the BS apparatus identifies that the terminal is handed over to another network supporting a QoS control policy different from that of the BS apparatus, QoS conversion information for converting the particular QoS parameter into a QoS parameter according to the different QoS control policy to the terminal.

11. The method of claim 10, further comprising:
inserting QoS control information for identifying the particular QoS parameter into a header of a particular downlink packet of the service flow, thereby allowing the terminal to transmit an uplink packet of the service flow with the particular QoS based on the QoS control information by the BS apparatus.

12. A method of controlling QoS, the method comprising:
acquiring QoS control information from a header of a particular downlink packet of downlink packets received from a Base Station (BS) by a terminal apparatus;
mapping a particular QoS parameter identified based on the QoS control information to a service flow of the particular downlink packet by the terminal apparatus; and
applying the particular QoS parameter to an uplink packet of the service flow and transmit the uplink packet with particular QoS defined in the service flow by the terminal apparatus,
wherein, when a handover is performed to another network supporting a QoS control policy different from that of the BS, the particular QoS parameter is converted into a QoS parameter according to the different QoS control policy based on QoS conversion information provided from the BS.

* * * * *